United States Patent
Parab et al.

(10) Patent No.: US 12,472,774 B1
(45) Date of Patent: Nov. 18, 2025

(54) VEHICLE HAVING AN AXLE TETHER TO REDUCE VEHICLE LIFT

(71) Applicant: FCA US LLC, Auburn Hills, MI (US)

(72) Inventors: Milind S Parab, Auburn Hills, MI (US); Pramod R Tatkare, Auburn Hills, MI (US); Pankaj V Kolhe, Auburn Hills, MI (US); Vikas Sanghavi, Auburn Hills, MI (US); Ranjit B Pandhare, Auburn Hills, MI (US); Meyyappan Valliappan, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/932,895

(22) Filed: Oct. 31, 2024

(51) Int. Cl.
*B60B 35/00* (2006.01)

(52) U.S. Cl.
CPC .................................. *B60B 35/005* (2013.01)

(58) Field of Classification Search
CPC .......... B62D 21/15; B62D 27/04; B62D 7/18; B62D 9/00; B60G 2204/4504; B60G 2206/016
See application file for complete search history.

(56) References Cited

U.S. PATENT DOCUMENTS

| | | | | |
|---|---|---|---|---|
| 5,947,223 A | * | 9/1999 | Rebmann | B60R 21/00 180/291 |
| 6,832,772 B2 | * | 12/2004 | Conover | B60G 17/025 280/124.106 |
| 7,021,414 B2 | * | 4/2006 | Campbell | B60G 3/185 180/254 |
| 7,798,505 B2 | * | 9/2010 | Neag | B60G 9/00 280/124.1 |
| 8,991,903 B1 | | 3/2015 | Alavandi et al. | |
| 9,216,766 B2 | | 12/2015 | Kerstan et al. | |
| 9,327,763 B2 | * | 5/2016 | Maier | B60R 19/00 |
| 9,522,584 B2 | * | 12/2016 | Jensen | B60G 7/001 |
| 11,247,523 B2 | * | 2/2022 | Hammer | B60G 3/20 |
| 11,584,440 B2 | * | 2/2023 | Hammer | B62D 25/08 |
| 11,643,035 B2 | * | 5/2023 | Kotrla | B60R 19/48 293/117 |
| 2001/0011804 A1 | * | 8/2001 | Bradshaw | B60G 11/28 280/124.1 |

(Continued)

FOREIGN PATENT DOCUMENTS

DE 102013015116 B4 3/2015

OTHER PUBLICATIONS

"Butler Built Front Axle Tether," Speedway Motors online, published Jan. 17, 2015, http://www.speedwaymotors.com/ButlerBuilt-BBP-4922-Sprint-Car-Front-Axle-Tether,92796.html. (Accessed on Apr. 1, 2025) (Year: 2015).*

(Continued)

*Primary Examiner* — Paul N Dickson
*Assistant Examiner* — Tiffany L Webb
(74) *Attorney, Agent, or Firm* — Jeremy J. Klobucar

(57) ABSTRACT

A vehicle including a vehicle frame, a front axle positioned proximate the vehicle frame, a pair of wheels attached to the front axle, and a tether having one end attached to the front axle and an opposing end attached to the frame, wherein the tether is configured to prevent the axle from moving rearwardly during a collision to prevent one of the wheels from under-riding the frame.

7 Claims, 7 Drawing Sheets

(56) References Cited

U.S. PATENT DOCUMENTS

2007/0138755 A1* 6/2007 Copsey ................ B60G 13/005
   280/124.128
2019/0337347 A1* 11/2019 Dudding .............. B60G 11/465

OTHER PUBLICATIONS

Butler Built, "Front Axle Tether System Installation Instructions." Speedway Motors online, published Jan. 17, 2015. pp. 1-2 of Front_Axle_Tether_Installation_Instructions.pdf. (Accessed on Apr. 1, 2025) (Year: 2015).*

* cited by examiner

VEHICLE HAVING AN AXLE TETHER TO REDUCE VEHICLE LIFT

FIELD

The present disclosure relates to a vehicle having an axle tether to reduce vehicle lift.

BACKGROUND

This section provides background information related to the present disclosure which is not necessarily prior art.

If a vehicle is involved in a small overlap frontal collision with an object or other vehicle, one of the front wheels and axle may be forced in a direction back and beneath a frame of the vehicle, which may cause a so-called "wheel underride" condition. If the wheel underride condition occurs, the vehicle may be caused to lift in an upward direction and, potentially, cause the vehicle to tip over. Inasmuch as tipping of the vehicle is undesirable, it is desirable to prevent or at least substantially minimize the ability of a wheel and/or axle to underride the frame during such a collision event.

SUMMARY

This section provides a general summary of the disclosure, and is not a comprehensive disclosure of its full scope or all of its features.

According to a first aspect of the present disclosure, there is provided a vehicle that includes a vehicle frame; a front axle positioned proximate the vehicle frame; a pair of wheels attached to the front axle; and a tether having one end attached to the front axle and an opposing end attached to the frame, wherein the tether is configured to prevent the axle from moving rearwardly during a collision to prevent one of the wheels from under-riding the frame.

According to the first aspect, the tether is a wired metal rope.

According to the first aspect, the tether is formed of steel.

According to the first aspect, the tether includes a first looped end wrapped around the axle and a second looped end wrapped around the frame.

According to a second aspect of the present disclosure, there is provided a vehicle that includes a vehicle frame; a front axle positioned proximate the vehicle frame; a pair of wheels attached to the front axle; a sway bar connected to the front axle; and a tether having one end attached to the front axle and an opposing end attached to the sway bar, wherein the tether is configured to prevent the axle from moving rearwardly during a collision to prevent one of the wheels from under-riding the frame.

According to the second aspect, the tether is a wired metal rope.

According to the second aspect, the tether is formed of steel.

According to the second aspect, the tether includes a first looped end connected to the axle and a second looped end connected to the sway bar.

According to the second aspect, the axle includes at least one flange having an aperture and the first looped end is attached to the aperture.

According to the second aspect, the sway bar incudes a through-hole and the second looped end is attached to the through-hole.

According to the second aspect, the sway bar is attached to the axle by a steering link.

According to the second aspect, the axle includes at least one flange having a first aperture positioned proximate the axle and a second aperture located distal from the axle, and the steering link is secured to the first aperture and the tether is secured to the second aperture.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. The example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Figure 1:
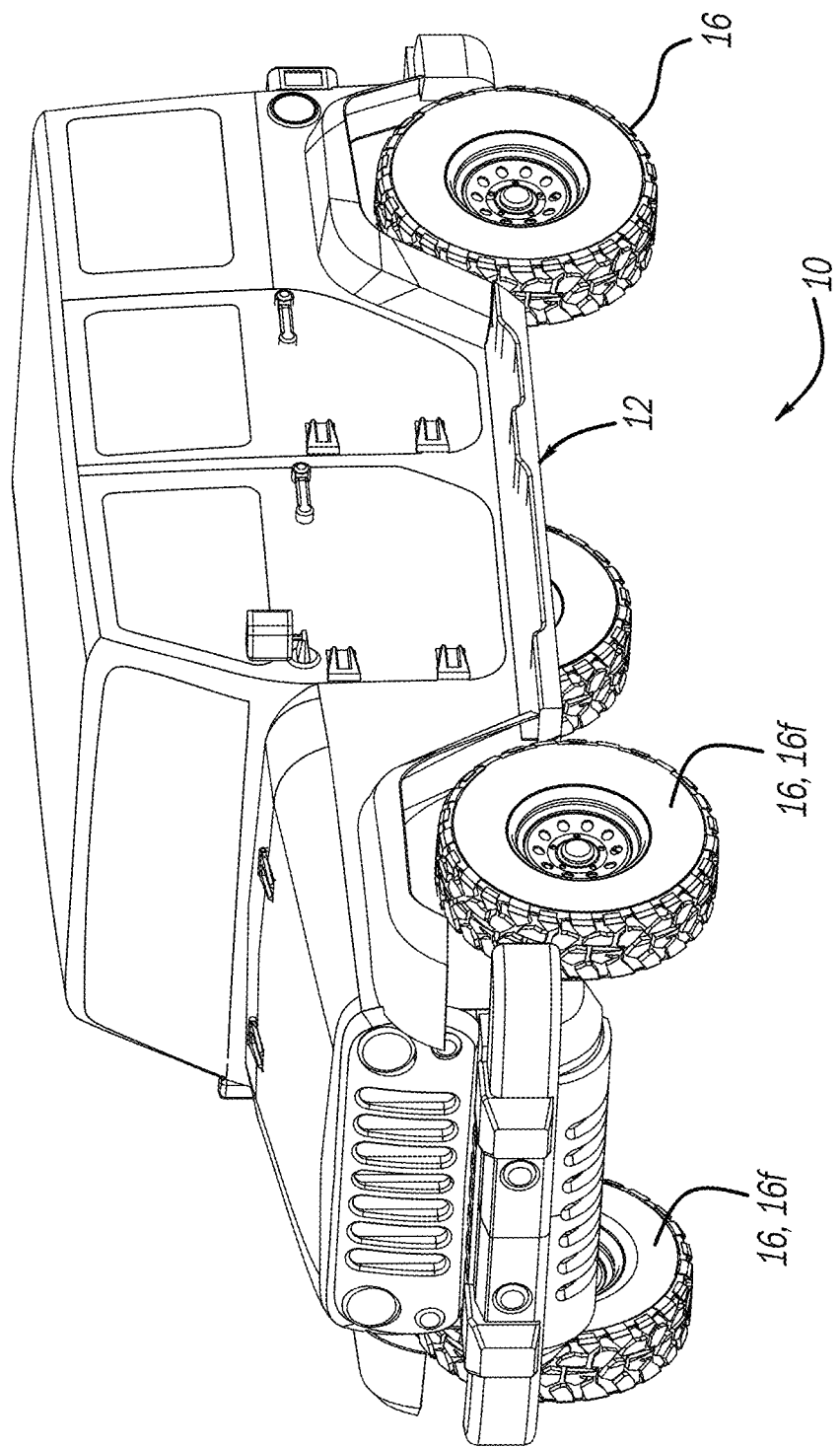
FIG. 1 is a perspective view of a vehicle according to a principle of the present disclosure.

FIG. 1 illustrates an example vehicle 10 according to a principle of the present disclosure. Vehicle 10 includes a body 12 attached to a frame 14 (FIG. 2) and a plurality of wheels 16, including a pair of front wheels 16*f* that are attached to a front axle 18 (FIG. 2) of vehicle 10. Front axle 18 may be a solid axle.

Figure 2:
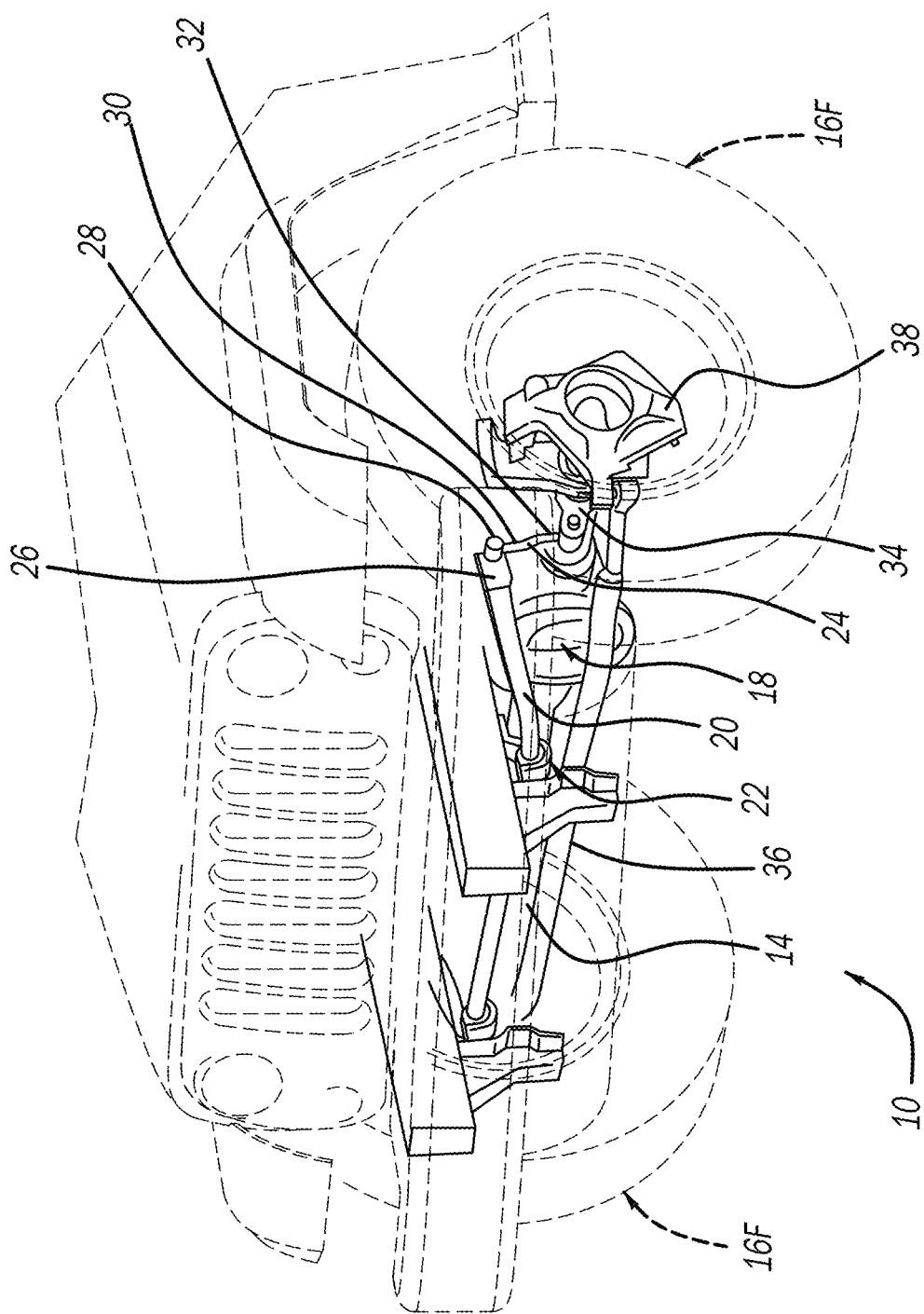
FIG. 2 is an isometric perspective view of a front axle of the vehicle illustrated in FIG. 1.

Referring to FIG. 2, it can be seen that in addition to front axle 18, vehicle 10 also includes a sway bar 20 that is attached to frame 14 and front axle 18. Sway bar 20 is attached to frame 14 using a sway bar attachment bracket assembly 22 and is attached to front axle 18 via a steering link 24. In this regard, a terminal end 26 of sway bar 20 includes an aperture (not shown) configured for receipt of a bolt 28 attached to a first end 30 of steering link 24. A second end 32 of steering link 24 is attached to an outwardly extending flange 34 that is connected to front axle 18. Additional components that are illustrated in FIG. 2 include a stabilizer bar 36 that extends between steering knuckles 38 of each front wheel 16f.

Figure 3:
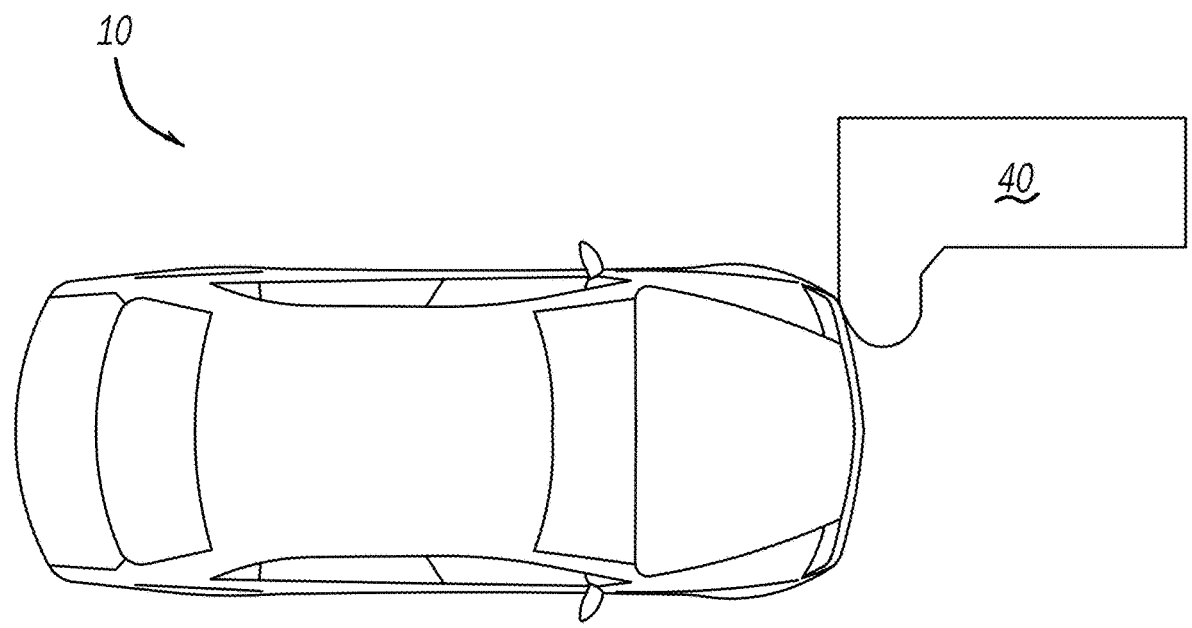
FIG. 3 is an overhead perspective view illustrating a potential collision with an object that the vehicle illustrated in FIG. 1 may experience.
Figure 4:
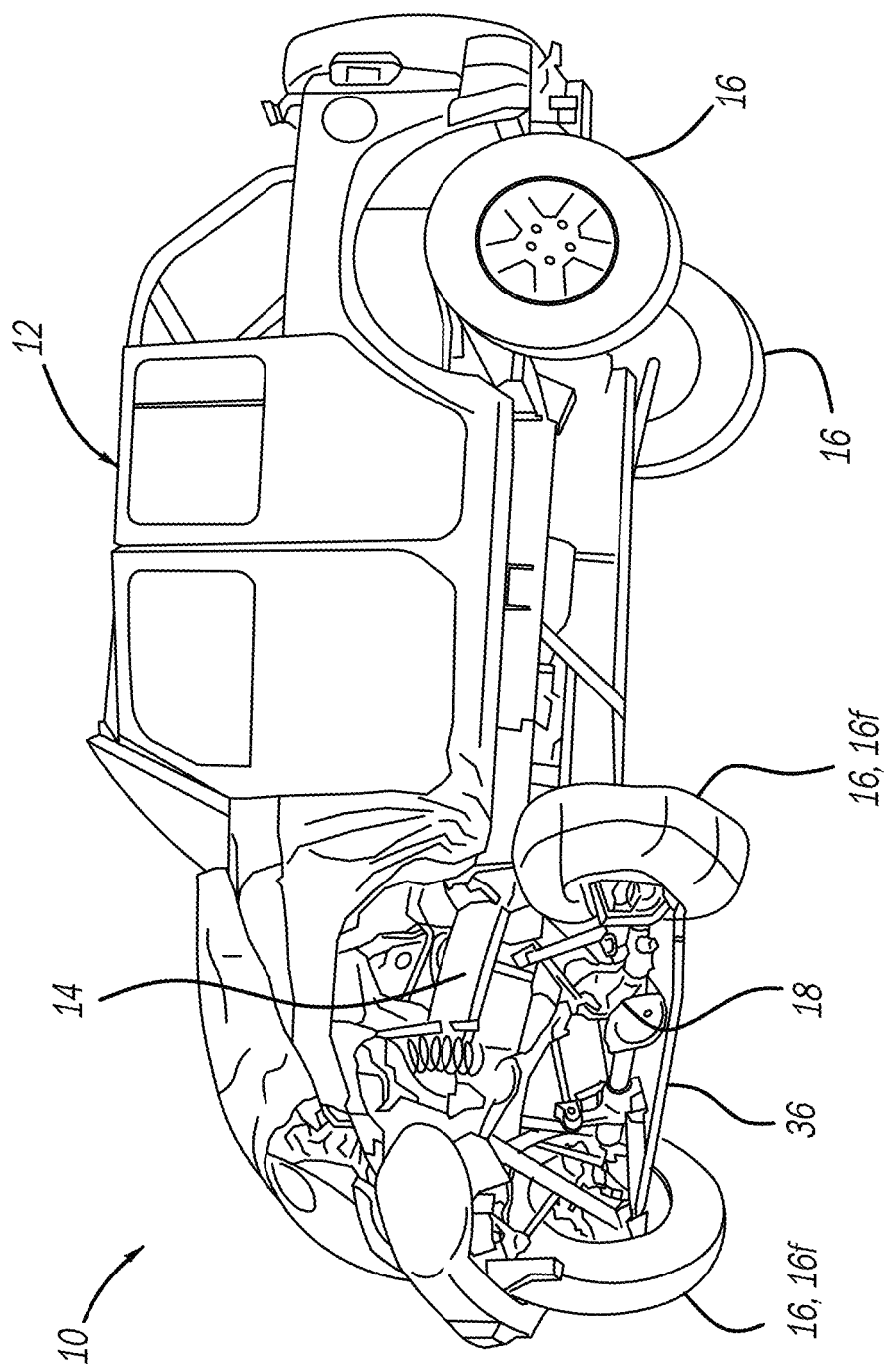
FIG. 4 is a perspective view of a after experiencing the collision illustrated in FIG. 3.

Now referring to FIGS. 3 and 4, it can be seen that when vehicle 10 is involved in a collision with an object 40 or other vehicle (not shown), one of the front wheels 16f and axle 18 can be forced in a direction back and beneath frame 14. In this regard, FIG. 4 illustrates a so-called "wheel underride" condition where front wheel 16f is positioned beneath frame 14, which can cause vehicle 10 to lift in an upward direction and, potentially, cause vehicle 10 to tip over. Inasmuch as tipping of vehicle 10 is undesirable, it is desirable to prevent or at least substantially minimize the ability of wheel 16f to underride the frame 14 during such a collision event with object 40.

Figure 5:
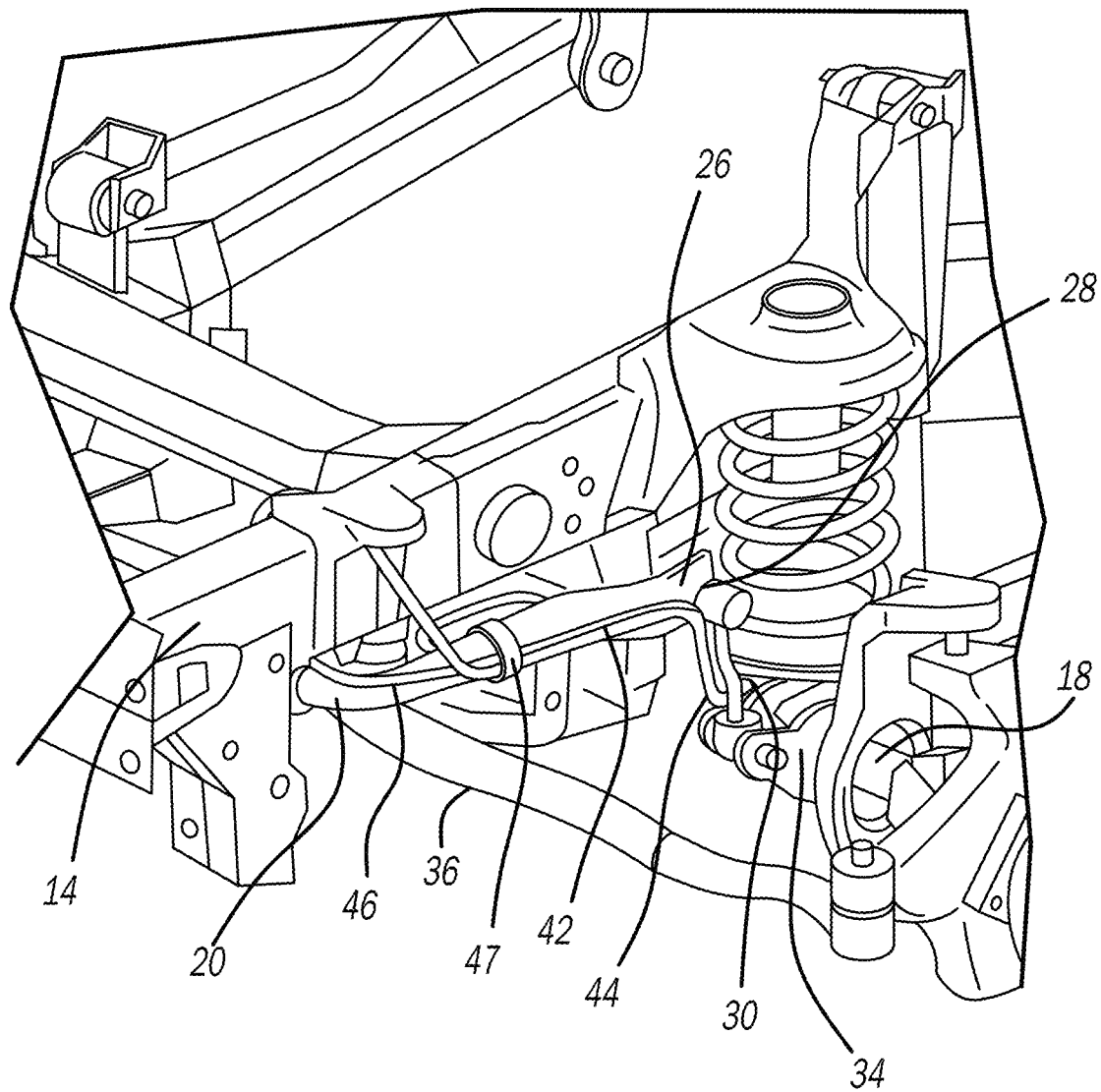
FIG. 5 is a partial isometric perspective view of the front axle illustrated in FIG. 2 including an axle tether according to a first aspect of the present disclosure.
Figure 6:
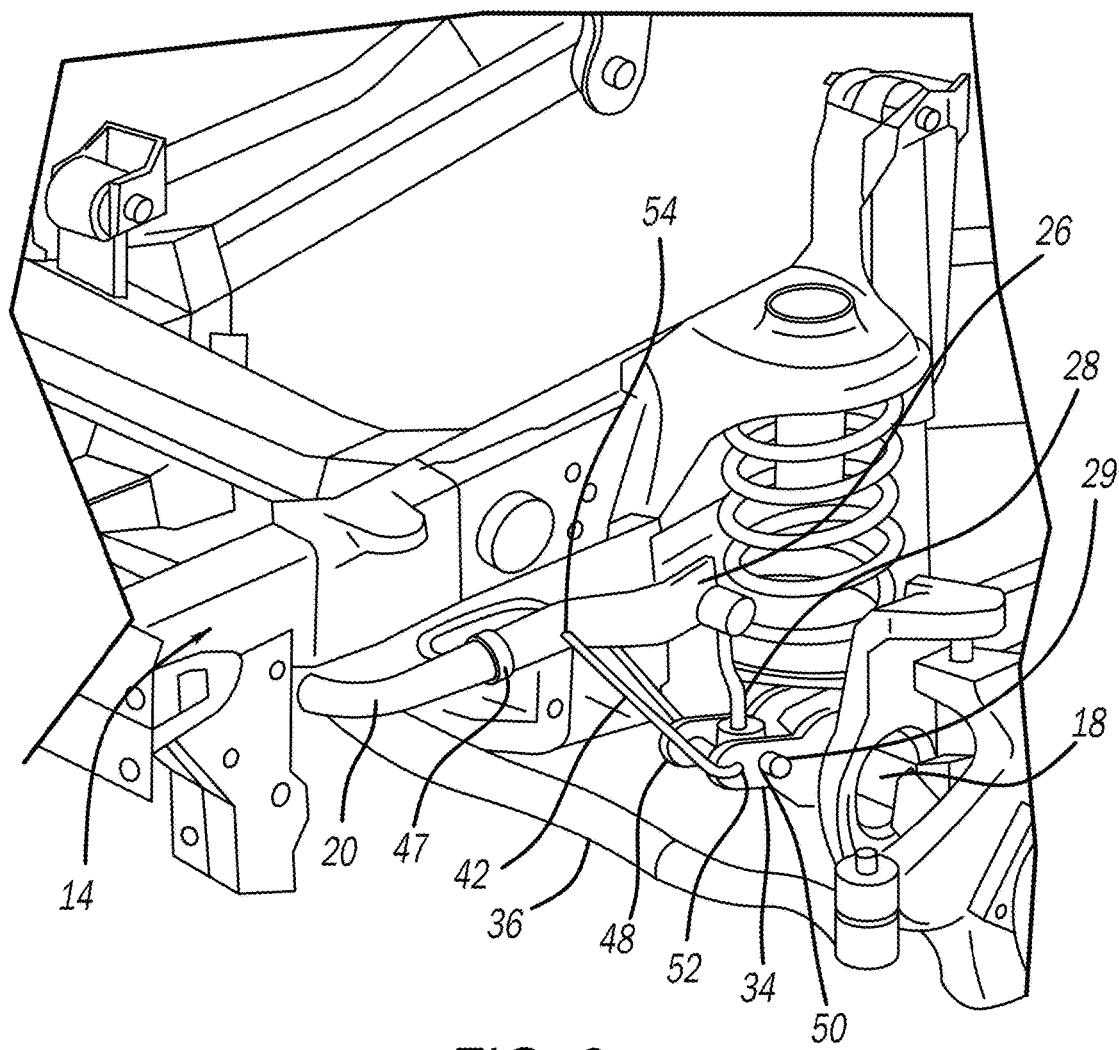
FIG. 6 is a partial isometric perspective view of the front axle illustrated in FIG. 2 including an axle tether according to a second aspect of the present disclosure.

With the above in mind, the present disclosure aims to prevent or at least substantially minimize the ability of wheel 16f to underride frame 14 during a collision with object 40 or another vehicle (not shown). To this end, as best shown in FIGS. 5 and 6, vehicle 10 is provided with a tether 42 that extends between either front axle 18 and frame 14 (FIG. 5) or between front axle 18 and sway bar 20 (FIG. 6). Tether 42 may be formed of a rigid material such as steel, and is preferably a steel wire rope. Alternatively, tether 42 may be formed of a metal chain. The primary aspect to keep in mind is that during a collision event with object 40 or another vehicle (not shown), tether 42 prevents axle 18 and wheel 16f from moving in a direction toward and beneath frame 14 to prevent or minimize the ability of wheel 16f to underride frame 14 and potentially cause vehicle 10 to tip.

Figure 7:
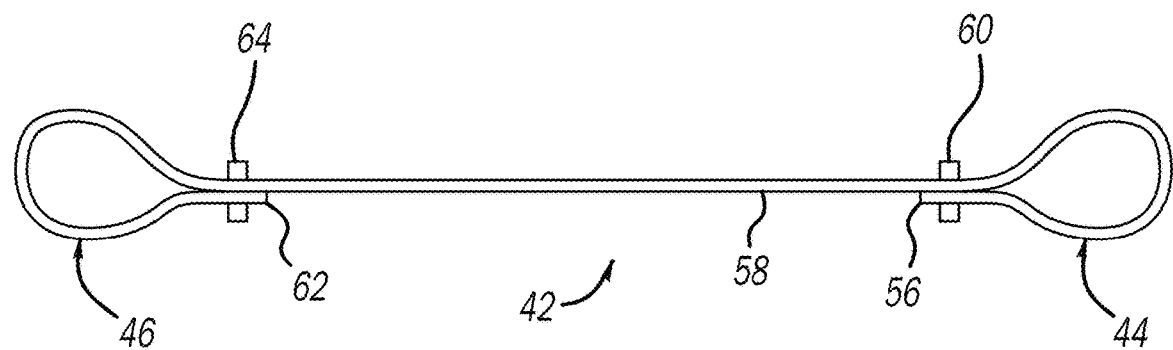
FIGS. 7 and 8 are perspective views of example axle tethers that may be used in the embodiments illustrated in FIGS. 5 and 6.

Referring to FIGS. 5 and 7, tether 42 includes a first looped end 44 that loops around axle 18 and a second looped end 46 that loops around frame 14. Preferably, tether 42 is attached between axle 18 and frame 14 in a manner where no slack exists (i.e., tether 42 does not sag), although some play may be present. To ensure that tether 42 contains no slack, a metal or plastic clip 47 may be used to secure tether 42 to sway bar 20. In any event, during a collision with object 40, tether 42 is designed and configured to restrain movement of front axle 18 in a rearward direction (i.e., in a direction toward a rear of vehicle 100). By restraining movement of front axle 18 during the collision, wheel 16f is also restrained from moving rearward such that the chance of wheel 16f under-riding frame 14 is prevented or at least substantially reduced. Accordingly, the chance that vehicle 10 may tip during such a collision is also at least substantially reduced.

Referring to FIG. 6, rather than tether 42 being looped around frame 14 and axle 18, it can be seen that tether 42 is attached to a through-hole 54 provided in sway bar 20. In addition, it can be seen that flanges 34 have been modified from those shown in FIGS. 2 and 5 to include a first aperture 50 that is configured for receipt of bolt 29 to also connect second end 32 of steering link 24 to axle 18, where first aperture 50 is located proximate axle 18. Flanges 34 also include a second aperture 52 that is configured for receipt of tether 42, where second aperture 52 is located distal from axle 18.

Now referring to FIG. 7, tether 42 is shown in more detail. As noted above, tether 42 is preferably formed of a steel wired rope. To form first looped end 44, a first terminal end 56 of tether 42 is looped back toward a body 58 of tether 42 and may be secured using a first steel clamp 60. Similarly, to form second looped end 46, a second terminal end 62 is looped back toward body 58 and secured using a second steel clamp 64. Use of clamps 60, 64 permits a size of looped ends 44, 46 to be variable and adjusted accordingly.

To attach tether 42 in the embodiment illustrated in FIG. 5, a terminal end (e.g., first terminal end 56) is wrapped around axle 18 and pulled back toward body 58 to form first looped end 44 and secured with one of the clamps 60 (e.g., first steel clamp 60). Then, the opposing terminal end (e.g., second terminal end 62) is wrapped around frame 14 and pulled back toward body 58 to form second looped end 46 and secured with one of the clamps (e.g., second steel clamp 64). As noted above, it is preferable that tether 42 is attached between axle 18 and frame 14 in a manner where no slack exists. Accordingly, clip 47 may secure tether 42 to sway bar 20.

Similarly, to attach tether 42 in the embodiment illustrated in FIG. 6, a terminal end (e.g., first terminal end 56) is fed through second apertures 52 of flanges 34 and pulled back toward body 58 to form first looped end 44 and secured with one of the clamps 60 (e.g., first steel clamp 60). Then, the opposing terminal end (e.g., second terminal end 62) is fed through the through-hole 54 of sway bar 20. After passing the second terminal end 62 through the through-hole 54, it may be either pulled back toward body 58 around sway bar 20 to form second looped end 46 and secured with one of the clamps (e.g., second steel clamp 64) or it may pulled back toward and secured to body 58 without looping over sway bar 20 and secured with clamp 64 such that clamp 64 abuts against sway bar 20 on a side of sway bar 20 that faces away from flanges 48. In either case, it is preferable that tether 42 is attached between axle 18 and frame 14 in a manner where no slack exists by using clip 47.

Figure 8:
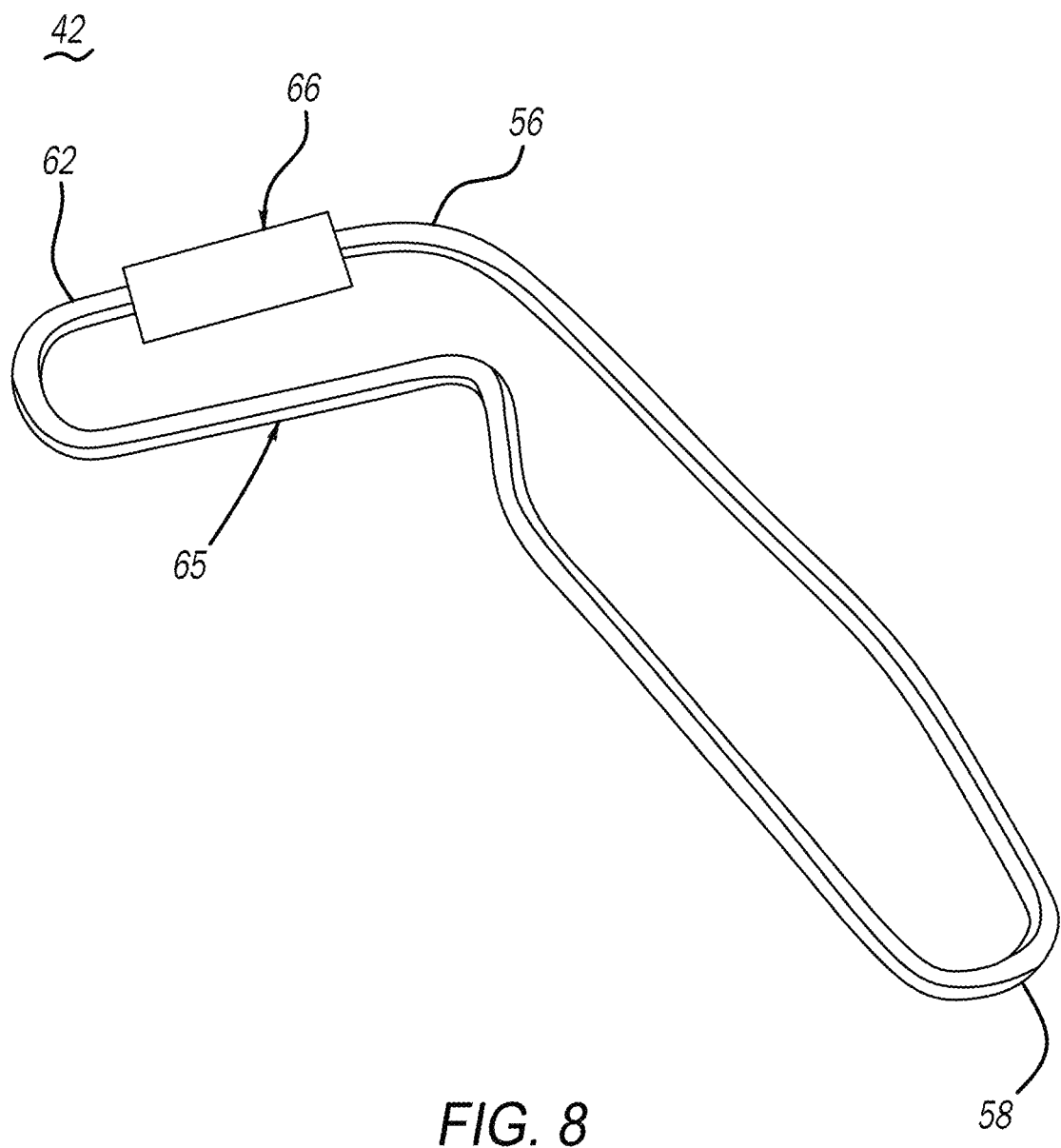

Tether 42 has been described above as having a first looped end 44 and second looped end 46 using first and second steel clamps 60 and 64. It should be understood, however, that first and second terminal ends 56 and 62 can be secured to one another to form a single closed loop 65 using a single steel clamp 66 if desired, as shown in FIG. 8. To attach the tether 42 shown in FIG. 8 in the embodiment illustrated in FIG. 5, first terminal end 56 may be looped around frame 14 and second terminal end 62 can be looped around axle 18 and brought together using single steel clamp 66 to form the single closed loop 65 about the frame 14 and axle 18. Then, any slack in the single closed loop 65 can be removed by using clip 47 to secure body 58 to sway bar 20.

Similarly, relative to the embodiment shown in FIG. 6, first terminal end 56 may be fed through aperture 54 of sway bar 20 and second terminal end 62 may be fed through second apertures 52 formed in flanges 34 attached to axle 18. The first and second terminal ends 56 and 62 may then be joined together using single steel clamp 66, and the body 58 of tether 42 that forms the single closed loop 65 may be secured to sway bar 20 using clip 47. Thus, regardless whether tether 42 uses a pair of closed loops 44 and 46 (FIG. 7) or a single closed loop 65 (FIG. 8), tether 42 may be reliably secured to either frame 14 or sway bar 20 and to axle 18 to prevent wheel 16f from under-riding vehicle 10 during a frontal collision event.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle, comprising:
   a vehicle frame;
   a front axle positioned proximate the vehicle frame;
   a pair of wheels attached to the front axle;
   a sway bar connected to the front axle by a steering link; and
   a tether having one end attached to the front axle and an opposing end attached to the sway bar,
   wherein the tether is configured to prevent the axle from moving rearwardly during a collision to prevent one of the wheels from under-riding the frame.

2. The vehicle according to claim 1, wherein the tether is a wired metal rope.

3. The vehicle according to claim 2, wherein the tether is formed of steel.

4. The vehicle according to claim 2, wherein the tether includes a first looped end connected to the axle and a second looped end connected to the sway bar.

5. The vehicle according to claim 4, wherein the axle includes at least one flange having an aperture and the first looped end is attached to the aperture.

6. The vehicle according to claim 5, wherein the sway bar incudes a through-hole and the second looped end is attached to the through-hole.

7. The vehicle according to claim 1, wherein the axle includes at least one flange having a first aperture positioned proximate the axle and a second aperture located distal from the axle, and
   wherein the steering link is secured to the first aperture and the tether is secured to the second aperture.

* * * * *